March 27, 1962   W. W. DOLLISON   3,026,904
AUTOMATIC RESET PILOT VALVE OPERATOR
Filed July 5, 1960
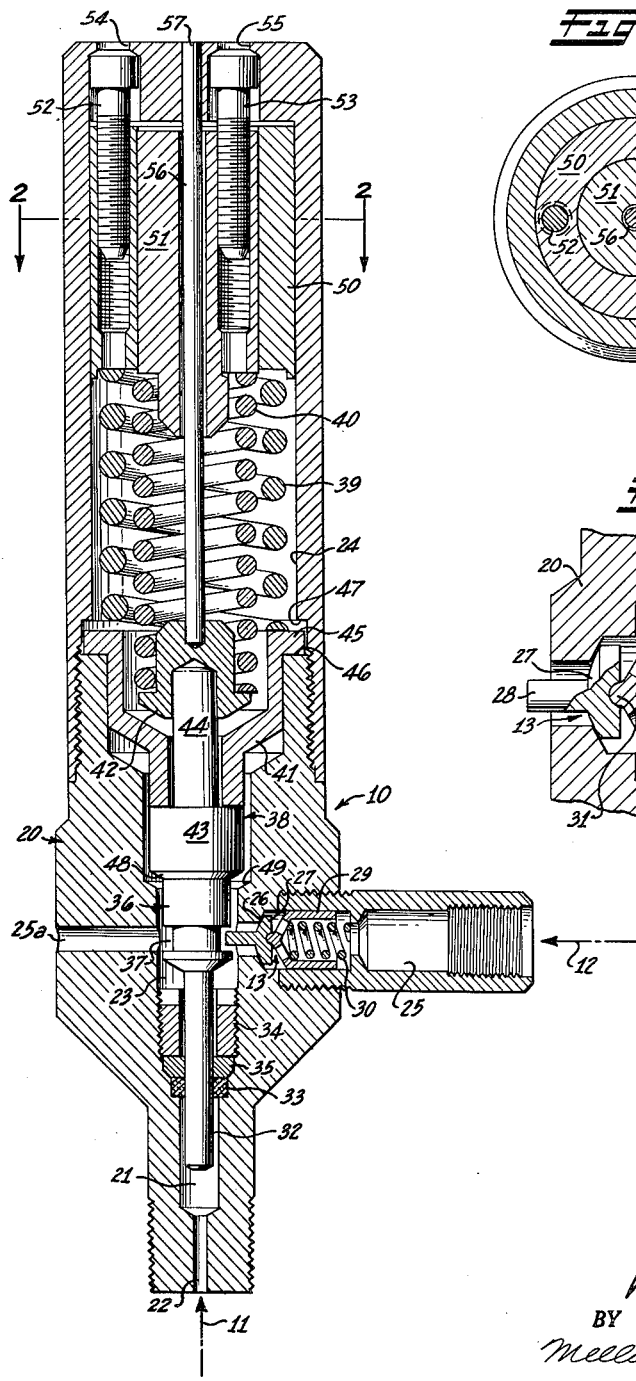
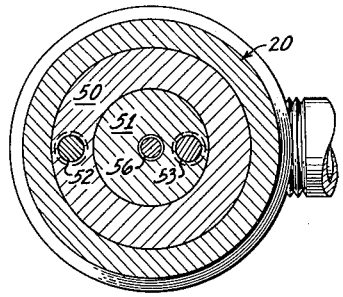
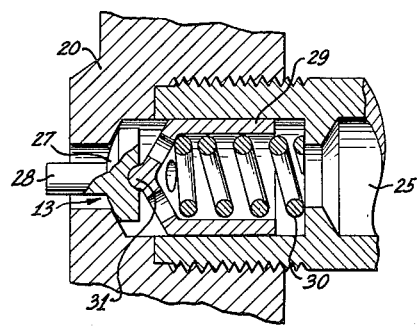
INVENTOR:—
WILLIAM W. DOLLISON
BY
Mellin and Hanscom
ATTORNEYS United States Patent Office 3,026,904
Patented Mar. 27, 1962

3,026,904
AUTOMATIC RESET PILOT VALVE OPERATOR
William W. Dollison, Dallas, Tex., assignor to Otis Engineering Corporation, Dallas, Tex., a corporation of Delaware
Filed July 5, 1960, Ser. No. 40,767
4 Claims. (Cl. 137—556)

This invention relates to pressure responsive devices for operating pilot valves. The invention more particularly involves a pressure responsive device that operates a pilot valve to bleed a control line in the event that a reference pressure becomes abnormally high or low.

While many device have heretofore been provided to act as a pilot control, the hereinafter described invention is particularly devised to cooperate in a fluid pressure control network including many such devices, each device being used to maintain a common control pressure. However, if the reference pressure line to which a particular device is connected becomes abnormally high or low, then the control line pressure will be bled, allowing other valve pilots to be closed.

This invention has particular utility in the well drilling industry and especially in connection with wells drilled from platforms that are remotely located in open waters and where many hazards continually jeopardize the safety of the wells and their related equipment. Because of such conditions it has been common practice to provide safety devices and control systems of various types.

One popular control system comprises a network of small diameter piping carrying gas or air at low but sufficient pressure to operate the control devices connected therewith. Thus, low pressure air is utilized to control high pressure wells and systems, and the pressure in this air control system normally maintains the devices communicating therewith in an inactive but ready condition. If, for any reason, the control pressure is relieved or removed from the system, the control devices are automatically actuated, causing wells to be shut-in or performing other similar tasks.

Control devices are presently known and available for performing the function of bleeding off the pressure in such an air control system. For example, devices have been made which are operated by the abnormal rise of the liquid level in a vessel, and other devices are responsive to fluid pressure levels. Inasmuch as the known pressure responsive devices utilize a Bourdon tube construction, those instruments are rather delicate, and while suitable for use on controlled laboratory pressures, they are not practical for being used in high pressure installations or upon inaccessible platform installations.

In brief, the invention comprises a valve body having a fluid flow passageway therethrough but normally obstructed by a seated valve element. The valve body also defines a pressure chamber having a plunger slidably mounted therein to either side of an intermediate balance position. A biasing means operably engages the plunger, urging it against an applied reference pressure and with such predetermined force as to maintain the plunger in its intermediate position. The movement of the plunger element as it is moved from its intermediate position is transmitted to the valve element upon abnormal changes in the applied fluid pressure. Accordingly, if a fluid control pressure were connected to the fluid flow passageway, this pressure would be maintained as long as the valve element remained seated. However, should the plunger be moved from its intermediate pressure by abnormally high or low applied fluid pressures then the valve element is unseated, causing the control pressure to be bled through the passageway. The invention is also characterized by the particular manner of its construction which allows the biasing means to be separately adjusted for applying predetermined maximum and minimum forces to the plunger. In this way, the responsive movement of the plunger may be controlled with respect to abnormality in applied fluid pressures. Another structural feature of the invention provides a visual indication of the plunger's position relative to the pressure chamber, thus permitting a determination of the pressure emanating from a reference line, as well as the reason (high or low applied pressure) which is responsible for a control line bleed-off.

It will be evident from this description that one object of this invention is to provide a pilot valve operating device that is of sturdy construction, being relatively unaffected by external weather conditions or corrosion attack.

A second object is to provide a pilot valve operating device which will bleed a pressure control line when a reference pressure source rises above or falls below predetermined pressures.

Another object of this invention is to provide a pilot valve operating device that will vent a pressure control line in response to an abnormality in a reference pressure source and will reset itself automatically when said reference pressure returns to a range of pressure normalcy.

It is a further object to provide a pilot valve operating device that is adapted to vent a pressure control line in response to an abnormality in a reference pressure and including a biasing means that may be adjusted for venting the pressure control line in response to various predetermined pressure ranges of said pressure source.

An additional object of this invention is to provide a pilot valve operating device that is adapted to vent a pressure control line in response to either abnormally high or low reference pressures and including a gauge which provides a visual indication of the existence of a pressure abnormality and further indicates whether such abnormility is caused by a high or low pressure.

Other objects will become apparent in view of the following detailed description and the accompanying drawings.

In the drawings forming a part of this application and in which like parts are indicated by like reference numerals throughout the same, FIG. 1 is a center section of a preferred embodiment of this invention;

FIG. 2 is a transverse section taken on lines 2—2 of FIG. 1; and

FIG. 3 is an enlarged detail section of the pilot valve structure incorporated in the embodiment of FIG. 1.

Referring to the drawings and FIG. 1 in particular, there is shown a preferred embodiment of a valve operating device 10 that is adapted to be connected to a reference pressure line 11 and a controlled pressure line 12. In brief, the valve operating device 10 will react to the applied pressure in line 11 and, depending upon the existing pressure level and the predetermined range of its own adjustment, will operate a pilot valve structure 13 contained therein, opening a passageway for venting pressure line 12. This system, as explained previously, is well suited for use in the well drilling industry. In such case the pressure line 11 might be connected to a well head and line 12 could be employed to transmit pressure to the pilot of a flow control valve. Then, if the pressure in line 11 should become abnormally high or low, endangering the drilling installation or equipment, the valve operating device 10 would act responsively, causing valve 13 to open and bleeding the control line 12.

In terms of greater detail, valve operating device 10 comprises a housing 20 that defines a pressure chamber 21 with a connecting outlet passage 22, a valve operating chamber 23, and an elongated chamber 24 for retaining a plunger control and indicating mechanism. Each of the chambers 21, 23 and 24 are arranged in axial relationship to one another and are continuously connected, although a fluid pressure seal is provided between chambers 21 and 23. In addition, housing 20 defines a fluid passageway 25 extending therethrough and intersecting valve operating chamber 23, said passageway having a valve seat 26 therein and an exhaust port 25a.

Passageway 25 is normally closed to the passage of fluid by a valve element 27 having a stem portion 28 that projects axially through the valve seat opening and into valve operating chamber 23. The valve element is biased into sealing engagement with seat 26 by a sleeve operating member 29 and a coaxial helical spring 30. As most clearly shown in FIG. 3, the member 29 contacts the valve element with an axial ball pivot 31 which allows the valve element to pivot thereon into an open tilted position while simultaneously retaining the valve element centrally in the passageway 23. A more detailed explanation of the valve element's operation will be given in connection with the valve control and actuating mechanism.

An elongated plunger stem 32 is reciprocally disposed in pressure chamber 21 and extends through a fluid pressure seal, comprising a gland 34, seal retainer 35 and a seal 33. A valve actuating member 36 having an annular recess 37, is connected intermediate the plunger stem 32 and an extension 38. As will be apparent, the plunger stem 32, valve actuating member 36 and extension 38 may be integrally formed since each is coaxial to the others and moves reciprocally therewith in the housing.

The plunger stem 32 functions as a piston, being acted upon by the fluid pressure within chamber 21 as transmitted thereto through passage 22. It will be further noted that the plunger is biased against an applied fluid pressure by plunger control mechanism comprising coaxial helical springs 39 and 40 and plunger actuating members 41 and 42, all of which is housed in chamber 24. The helical springs 39 and 40 impose a biasing force upon members 41 and 42, respectively, and members 41 and 42 are in turn adapted to respectively move against the body portion 43 and end portion 44 of extension 38.

During normal operating conditions the plunger is retained in an intermediate position by the biasing force of springs 39 and 40 as well as the applied fluid pressure. (This is the position as shown in FIG. 1). The annular recess 37 of member 36 is positioned radially opposite to the stem portion 28 of valve element 27 while the plunger is maintained in its normal intermediate position, and the stem portion is confined within this recess. Obviously, should the plunger and valve actuating member 36 be moved to either side of the intermediate position the stem portion 28 will be engaged and moved transversely of passageway 25. Such a movement of the valve stem will cause the valve element to be pivoted upon the ball pivot 31, thereby unseating the element and allowing fluid to pass through passageway 25, chamber 23 and exhaust port 25a.

Plunger actuating member 41 is formed as a sleeve, allowing end 44 to pass freely therethrough. In addition, member 41 is provided with an annular radial flange 45 which is lodged between shoulders 46 and 47 of the housing. With such a construction the member 41 has only limited reciprocal movement and in the normal or subnormal range of applied pressures imposes no biasing force upon body portion 44, shoulder 46 acting as a stop means. In the event that abnormally high fluid pressures are applied within chamber 21, shoulder 47 will limit movement of member 41 and valve actuating member 36, thereby preventing damage to the valve stem 28 or other operating mechanism.

The plunger actuating member 42 is adapted to be continuously operable in opposing fluid pressures within chamber 21 for all ranges of normal and abnormally high applied pressures. In the event that a subnormal pressure is applied, then the biasing force of spring 40 will cause the extension 38 and plunger stem 32 to be moved downwardly from the position shown. In cases of extremely low applied pressures the frustum surface 48 of member 43 will engage the complementary shoulder surface 49 of the housing, thus limiting movement of valve actuating member 36 and protecting the valve mechanism.

It will be noted that upward movement of the plunger stem 32 from its lowermost position (occupied while under subnormal pressures) is opposed by spring 40 alone until body portion 43 of extension 38 engages plunger actuating member 41. Further upward travel of the plunger 32 is in opposition to the combined forces of springs 39 and 40.

Biasing springs 39 and 40 are mounted within housing 20 against coaxial foot bushing members 50 and 51, respectively, said foot members being individually adjustable in the direction of plunger movement. For this purpose a pair of captured screw members 52 and 53 threadedly engage their respective foot members 50 and 51. The screws have slotted heads which are exposed through axially slotted openings 54 and 55 in the housing, allowing the screws to be rotated and the foot members to be adjusted. Since the biasing springs are compressed between their footings and their respective plunger actuating members, the heads of the screw members are retained in the slotted openings against annular internal shoulders within each slotted opening, as shown.

It will be seen that the biasing force of each helical spring may be adjusted by simply rotating the associated screw member, thereby causing the corresponding foot bushing to be individually moved and compressing its spring to a greater or lesser degree. Accordingly, this structure provides a useful means for controlling the movements of the plunger and valve actuating member, and allows the device to be adjusted for various pressures. Moreover, since the valve actuating mechanism is controllable for both high and low abnormal pressures the range of what may be considered normal pressures is also adjustable.

The valve operating device 10 also includes an indicator rod member 56 that is coaxially disposed in housing 20, said rod being mounted to the plunger actuating member 44 and projecting though a slotted opening in the housing, as well as an axial passage provided by bushing member 51. The end 57 of rod 56 may be viewed from the exterior of the housing 20 for indicating the position of the plunger relative to said chamber. The rod member shown is of a length which indicates the plunger to be in the center of intermediate positions when its end is flush with the housing. Thus, when a subnormal pressure is applied within pressure chamber 21 the end of rod 56 will be drawn into the housing. Conversely, an abnormally high fluid pressure will push the rod indicator out of the housing, exposing the end 57 thereof.

Before installing the valve operating device in a pressure controlled system the device may be conveniently adjusted in the following manner:

Beginning with a minimum load on springs 39 and 40 by adjustment of screw members 52 and 53, a standard low pressure is applied to pressure chamber 21. (This magnitude may be termed the lower limit of the range.) Adjusting screw member 40 is then turned down until the upper end 57 of indicator rod 56 is just below the upper surface of housing 20, indicating that the plunger and valve actuating member are at the lower limit of intermediate positions and that valve 27 is unseated. Next, the pressure in chamber 21 is increased to the high pressure magnitude at which the device is to actuate, and this pressure may be termed the upper limit of the selected range. Adjusting screw member 39 is now turned down until the upper end 57 is flush with the upper surface of the housing and then backed-off until the rod protrudes slightly from the housing, indicating that the plunger and valve actuating member are at the upper limit of intermediate positions and that the valve element is unseated.

The adjusted valve operating device may now be connected into a fluid pressure and control system as previously explained. Providing the control pressure remains within the preselected range, the valve element 27 will be seated, closing off passageway 25 and maintaining a pilot pressure. However, if the control pressure within chamber 21 falls below or exceeds the preselected limits, valve element 27 will be tilted, opening passageway 25 and bleeding off the pilot pressure through vent 25a. The pilot valve operating devices associated with the controlled pilot pressure will then be actuated.

It is to be understood that the form of the invention herewith shown and described is to be taken as a preferred example thereof; and while various changes in the size, shape and arrangement of certain parts may be resorted to without departing from the spirit of the invention or the scope of the attached claims, each of such changes is contemplated.

Having thus described my invention, what I claim and desire to secure by Letters Patent is:

1. A pilot valve operating device comprising a valve body having a fluid flow passageway therethrough, a valve seat formed in said flow passageway, a valve element seatable on said valve seat and having a stem portion projecting axially through said valve seat, means resiliently biasing said valve element into normal seating engagement with said valve seat and permitting unseating of said valve element upon transverse movement of said stem portion projecting through said valve seat, said valve body also having a pressure chamber formed therein, a reciprocally slidable plunger in said pressure chamber, said plunger having an intermediate balance position relative to said pressure chamber, biasing means operable to oppose movement of said plunger when acted upon by fluid pressure within said pressure chamber, said biasing means urging said plunger with predetermined force against normally imposed fluid pressures to maintain said plunger in its intermediate balance position, means operatively associated and movable in unison with said plunger for transversely engaging and moving said stem portion upon predetermined movement of said plunger from its intermediate balance position to unseat said valve element.

2. The pilot valve operating device of claim 1 wherein said first mentioned means comprises a retention member reciprocally disposed in said passageway, said member having an axial ball pivot engaging said valve element and urging said element toward said valve seat, and a biasing means urging said member toward said valve element.

3. The pilot valve operating device of claim 1 including means for adjusting the predetermined force of said plunger biasing means.

4. The pilot valve operating device of claim 1 including a rod member reciprocally movable with said plunger, said rod member being adapted to be viewed from the exterior of said valve body for indicating the position of said plunger relative to said chamber.

References Cited in the file of this patent

UNITED STATES PATENTS 2,902,046  Dollison _____ Sept. 1, 1959